(12) United States Patent
Tiirola et al.

(10) Patent No.: US 10,455,554 B2
(45) Date of Patent: Oct. 22, 2019

(54) SIGNALLING ARRANGEMENT FOR INTER-SITE CARRIER AGGREGATION HAVING ONLY SINGLE COMPONENT CARRIER AVAILABLE IN UPLINK DIRECTION

(75) Inventors: Esa Tapani Tiirola, Kempele (FI);
Kari Juhani Hooli, Oulu (FI); Kari Pekka Pajukoski, Oulu (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 220 days.

(21) Appl. No.: 14/122,296

(22) PCT Filed: Jun. 1, 2011

(86) PCT No.: PCT/EP2011/059077
§ 371 (c)(1),
(2), (4) Date: Nov. 26, 2013

(87) PCT Pub. No.: WO2012/163423
PCT Pub. Date: Dec. 6, 2012

(65) Prior Publication Data
US 2014/0126556 A1    May 8, 2014

(51) Int. Cl.
*H04W 72/04* (2009.01)
*H04L 12/911* (2013.01)
(Continued)

(52) U.S. Cl.
CPC ....... *H04W 72/0413* (2013.01); *H04L 5/0053* (2013.01); *H04L 47/827* (2013.01);
(Continued)

(58) Field of Classification Search
CPC . H04W 72/00; H04W 72/04; H04W 72/0406; H04W 72/042; H04W 72/005;
(Continued)

(56) References Cited

U.S. PATENT DOCUMENTS

| | | | | |
|---|---|---|---|---|
| 4,577,316 A | * | 3/1986 | Schiff | ......... H04B 7/2125 370/324 |
| 7,227,850 B2 | * | 6/2007 | Dahlman | ......... H04B 7/2618 370/330 |

(Continued)

FOREIGN PATENT DOCUMENTS

| | | |
|---|---|---|
| CN | 1428023 A | 7/2003 |
| CN | 102754496 A | 10/2012 |
| EP | 1 354 426 B1 | 12/2001 |

OTHER PUBLICATIONS

3GPP TSG RAN WG1 Meeting #59, Jeju, Korea, Nov. 9-13, 2009, R1-094642, "Carrier aggregation configurations and DL/UL linkage", Nokia, Nokia Siemens Networks, 4 pgs.
(Continued)

*Primary Examiner* — Afsar M Qureshi
(74) *Attorney, Agent, or Firm* — Harrington & Smith (57) ABSTRACT

An apparatus is described which is connectable to a first network node by a first downlink component carrier and to at least a second network node by a at least second downlink component carrier, wherein the apparatus provides a single uplink connection. The uplink connection is shared among a first uplink component carrier to the first network node and at least a second up link component carrier to the at least second network node. Sharing of the uplink connection may be performed in a time divisional multiplexed manner. Furthermore, a corresponding method is described.

16 Claims, 5 Drawing Sheets

(51) Int. Cl.
*H04W 56/00* (2009.01)
*H04L 5/00* (2006.01)

(52) U.S. Cl.
CPC ......... *H04W 56/0005* (2013.01); *H04L 5/001* (2013.01); *H04L 5/0007* (2013.01); *H04L 5/0035* (2013.01)

(58) Field of Classification Search
CPC ... H04W 72/12; H04W 52/34; H04W 52/325; H04L 1/1861; H04L 5/001
See application file for complete search history.

(56) References Cited

U.S. PATENT DOCUMENTS

| | | | | |
|---|---|---|---|---|
| 8,305,998 | B2* | 11/2012 | Marinier | H04B 1/707 370/334 |
| 8,483,156 | B2* | 7/2013 | Toskala | H04L 1/16 370/236.1 |
| 9,642,140 | B2* | 5/2017 | Ng | H04W 72/0453 |
| 2002/0094834 | A1 | 7/2002 | Baker et al. | 455/522 |
| 2006/0067281 | A1* | 3/2006 | Kwak | H04W 76/40 370/337 |
| 2010/0098012 | A1* | 4/2010 | Bala | H04L 5/001 370/329 |
| 2010/0208679 | A1* | 8/2010 | Papasakellariou et al. | 370/329 |
| 2010/0271970 | A1* | 10/2010 | Pan et al. | 370/252 |
| 2010/0272091 | A1* | 10/2010 | Fabien | H04W 48/08 370/345 |
| 2011/0070907 | A1* | 3/2011 | Chou | 455/507 |
| 2011/0170508 | A1* | 7/2011 | Xue | H04W 74/08 370/329 |
| 2011/0200032 | A1* | 8/2011 | Lindstrom et al. | 370/350 |
| 2011/0243261 | A1* | 10/2011 | Bienas | H04W 72/1215 375/260 |
| 2011/0268067 | A1* | 11/2011 | Seo | H04B 7/0632 370/329 |
| 2012/0046032 | A1* | 2/2012 | Baldemair et al. | 455/434 |
| 2012/0113907 | A1* | 5/2012 | Baldemair | H04W 52/146 370/329 |
| 2012/0207109 | A1* | 8/2012 | Pajukoski | H04L 1/0029 370/329 |
| 2012/0250541 | A1* | 10/2012 | Ko | H04L 1/0026 370/252 |
| 2013/0153298 | A1* | 6/2013 | Pietraski | E21B 7/04 175/45 |
| 2014/0029558 | A1* | 1/2014 | Frederiksen | H04L 5/001 370/329 |
| 2014/0071901 | A1* | 3/2014 | Sundberg | H04W 72/0453 370/329 |
| 2015/0009923 | A1* | 1/2015 | Lei | H04W 72/0413 370/329 |
| 2015/0237611 | A1* | 8/2015 | Ahn | H04W 72/0406 370/329 |
| 2016/0302186 | A1* | 10/2016 | Lv | H04L 1/0026 |

OTHER PUBLICATIONS

Akyildiz, I.F., et al., "The evolution to 4G cellular systems: LTE-Advanced", © 2010 Elsevier B.V., 28 pgs.
LG, "LTE-Advanced", Telecommunications Technology Association Korea, Nov. 4, 2010, 182 pgs.
R1-093905; Nokia Siemens Networks, et al.; ,,UL control signalling for carrier aggregation; 3GPP TSG RAN WG1 Meeting #58bis; Miyazaki, Japan, Oct. 12-16, 2009.

* cited by examiner

SIGNALLING ARRANGEMENT FOR INTER-SITE CARRIER AGGREGATION HAVING ONLY SINGLE COMPONENT CARRIER AVAILABLE IN UPLINK DIRECTION

FIELD OF THE INVENTION

The present invention relates to apparatuses, methods and a computer program product for a signalling arrangement for inter-site carrier aggregation having only single component carrier available in uplink direction

RELATED BACKGROUND ART

The following meanings for the abbreviations used in this specification apply:
A/N, Ack/Nack Acknowledgement/Negative Acknowledgement
CA Carrier aggregation
CC Component carrier
CQI Channel quality indicator
CSI Channel state information
DL Downlink
DM Demodulation
eNB enhanced Node-B, LTE base station
FDD Frequency division duplexing
HARQ Hybrid automatic repeat request
LTE Long term evolution
PMI Precoder matrix indicator
PRACH Physical random access channel
PRB Physical resource block
PUCCH Physical uplink control channel
PUSCH Physical uplink shared channel
RF Radio frequency
RI Rank indicator
RS Reference signal
SC-FDMA Single carrier—frequency division multiple access
SR Scheduling request
SRS Sounding reference signal
TDM Time division multiplexing
UCI Uplink control information
UE User equipment
UL Uplink
X2 Standardized signalling interface between eNBs Embodiments of the present invention relate to LTE-Advanced system which will most likely be part of LTE Rel. 11 or beyond. More specifically, we focus on uplink control signalling in the case of inter-site carrier aggregation having only single component carrier available in the UL direction. Carrier aggregation (CA) was introduced in Rel-10 of the E-UTRA specifications. By means of carrier aggregation (CA), two or more component carriers (CCs) are aggregated in order to support wider transmission bandwidths up to 100 MHz.

Figure 1:
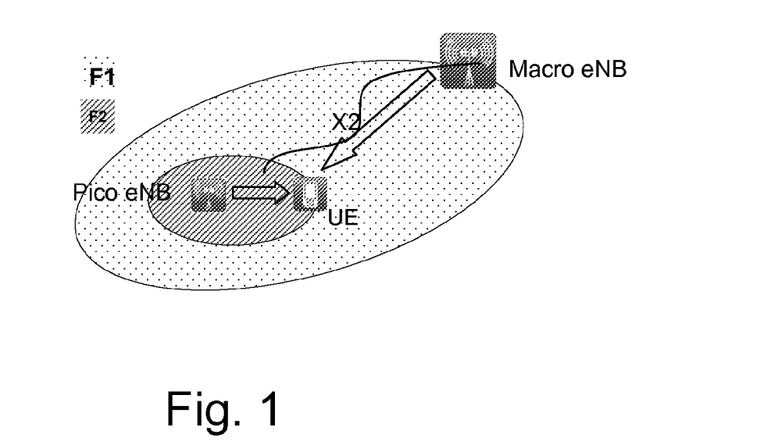
FIG. 1 shows an example for inter site carrier aggregation.

An exemplary deployment scenario is depicted in FIG. 1. FIG. 1 shows an example for inter site carrier aggregation, and shows in more detail a heterogeneous network (HetNet) scenario with two carriers. In particular, a macro eNB which serves a macro cell indicated by F1 (Frequency 1), and a pico eNB which serves a pico cell indicated by F2 (Frequency 2) are shown. A UE is connected to both eNBs. One of the carriers is allocated to macro layer and another for femto/pico layer, respectively. Another assumption is that there is a (logical) signalling entity (e.g. X2 interface) between macro and femto/pico, which can be used to convey control signalling between non-collocated cells. However, latency requirements for the control signalling are relatively relaxed.

Considering the Scenario in FIG. 1, as said, the two carriers (cells) operate independently to a large extent (scheduling etc). However, it would be beneficial to utilize some of the carrier aggregation functionality also in that case, to enable e.g. simultaneous DL data transmission on both carriers. This sets also some new requirements to the UL.

Figure 2:
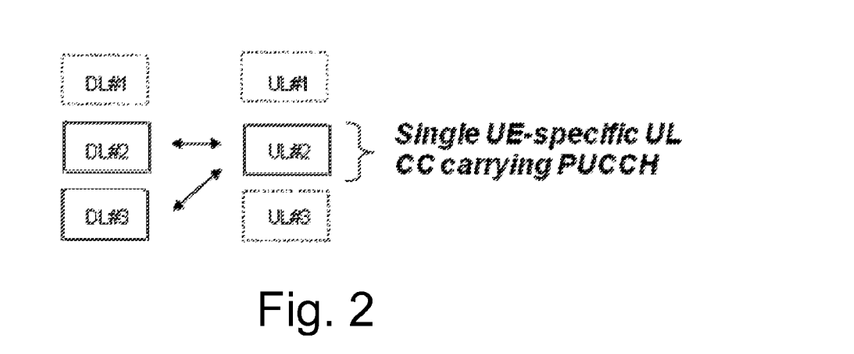
FIG. 2 shows a PUCCH arrangement in Rel-10 carrier aggregation.

The problem is that Rel-10 carrier aggregation does not work in inter-site carrier aggregation scenario having independent L1/L2 schedulers operating on different sites. FIG. 2 below shows the PUCCH (Physical Uplink Control Channel) arrangement in the case of Rel-10 carrier aggregation. The basic principle is that the PUCCH is always located on only one UL CC (the primary CC) and all the UL control signalling (related to all DL cells) is carried over that particular UL CC (UL CC#2 in FIG. 2.). That is, in the example of FIG. 2, all the UL control signalling related to e.g. DL#2 and DL#3 are carried over a single PUCCH on UL#2.

However, in the scenario of interest this arrangement becomes infeasible, since it is clear that in this kind of scenario, the UL control signals (CQI/PMI/RI, HARQ ACK/NACK) corresponding to all aggregated DL component carriers need to be available at the same place (w/o delays). This is necessary to ensure that the two schedulers can operate fully independently.

From the signalling point of view the simplest way to cope with the issue is to have two UL in the UE operating somewhat autonomously, each of them transmitting the UL control signalling related to the corresponding DL CC. However, that solution would lead to rather complicated UE implementation, as it is far from trivial to include two full TX chains into the terminal with the capability to have them both transmitting simultaneously.

Figure 3:
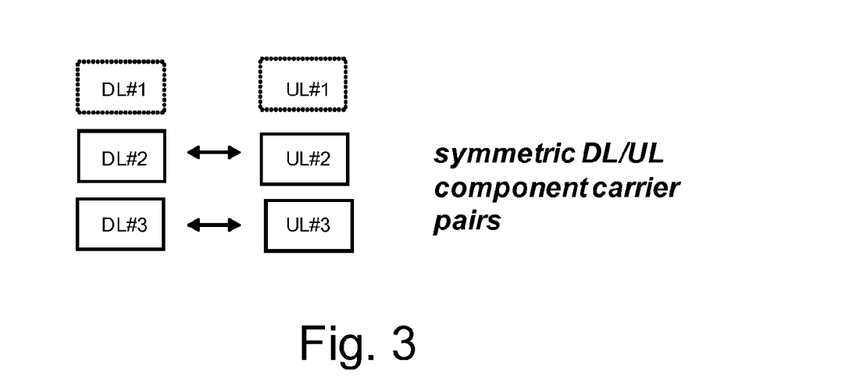
FIG. 3 shows a potential UCI solution of inter-site CA.

It was discussed already during Rel-10 standardization that it would be possible to define PUCCH/UCI functionality in a way that it consists of multiple symmetric DL/UL component carrier pairs (see e.g., R1-094642). This option is depicted in FIG. 3, which shows a potential UCI solution for intersite CA. In this solution UL/DL control signalling is made completely independent between among different component carriers.

The main problems of this approach are:
- It does not support asymmetric carrier aggregation having only one component carrier available in UL side (this is the most important UE category with carrier aggregation)
- UL coverage is an issue with this kind of arrangement. This is due to the fact that UL power control needs to work independently among two UL CCs. This results in a 3-dB coverage loss compared to Rel-10 intra-site CA+potentially further degradation due to power back-off required to fulfil necessary emission requirements.

SUMMARY OF THE INVENTION

Embodiments of the present invention are aiming at addressing some of the problems discussed above and to enable uplink control signaling in case of inter-site carrier aggregation having only a single component carrier available in the UL direction.

According to some embodiments of the present invention, an apparatus is connectable to a first network node by a first downlink component carrier and to at least a second network node by a at least second downlink component carrier, wherein the apparatus provides a single uplink connection. The uplink connection is shared among a first uplink component carrier to the first network node and at least a second uplink component carrier to the at least second network node.

Sharing of the uplink connection may be performed in a time divisional multiplexed manner.

In this way, it is possible to enable uplink control signaling even in case of an inter-site carrier aggregation in which only a single component carrier is available in the UL direction.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

According to several embodiments of the present invention, a shared UL functionality for multiple DL carriers is provided.

Figure 4:
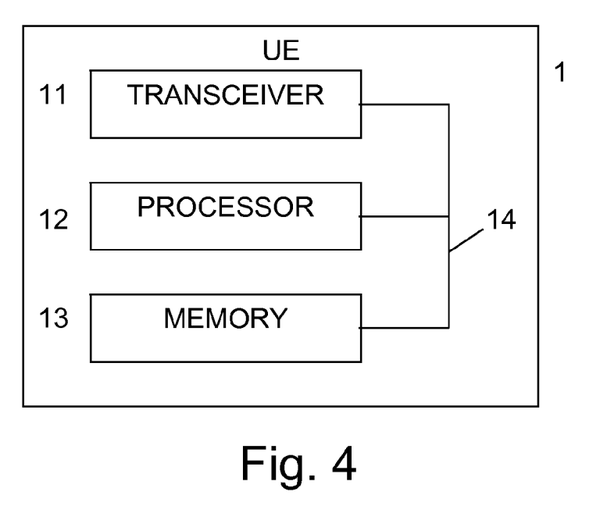
FIG. 4 shows an example for a user equipment according to an embodiment of the invention.

FIG. 4 illustrates a simplified block diagram of a user equipment 1 according to an embodiment of the present invention. It is noted that the user equipment is only an example, and the corresponding apparatus according to the embodiment may consist only of parts of the user equipment, so that the apparatus may be installed in a user equipment, for example.

The user equipment 1 comprises a transceiver 11 configured to be connectable to a first network node by a first downlink component carrier and to at least a second network node by a at least second downlink component carrier, wherein the transceiver is configured to provide a single uplink connection (i.e., a single uplink carrier, as described in the following). Furthermore, the user equipment comprises a processor 12 which is configured processor configured to control the transceiver such that the uplink connection is shared between a first uplink component carrier to the first network node and at least a second uplink component carrier to the at least second network node.

Thus, the single uplink connection (carrier) is shared for the uplink signalling in relation to the (at least) two downlink carriers.

The user equipment 1 may also comprise a memory 13 in which programs for carrying out the functions according to the embodiment are stored. The transceiver 11, the processor 12 and the memory 13 may be inter-connected by a suitable connection 14, e.g., a bus or the like.

Figure 5:
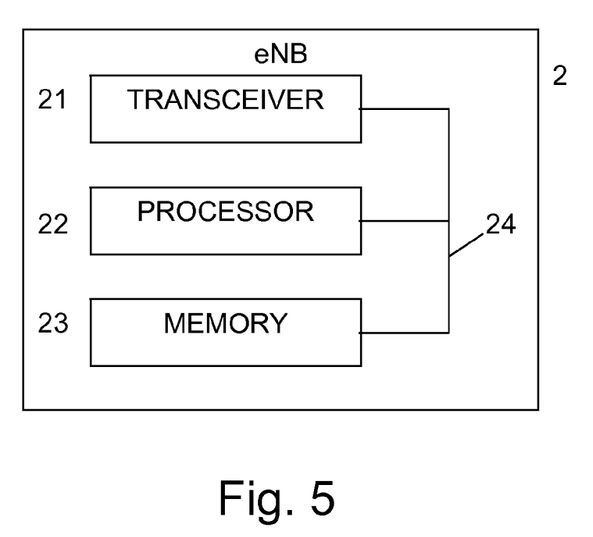
FIG. 5 shows an example for an eNB according to an embodiment of the invention.

FIG. 5 illustrates a simplified block diagram of a eNB 2 according to an embodiment of the present invention. It is noted that the eNB, and the corresponding apparatus according to the embodiment may consist only of parts of the eNB, so that the apparatus may be installed in an eNB, for example. Moreover, also the eNB is only an example and may be replaced by another suitable network node, such as a base station or the like.

The eNB 2 comprises a transceiver 21 configured to be connectable to a user equipment (e.g., UE 1 shown in FIG. 4) by a first downlink component carrier and by a single uplink connection. The uplink connection is shared among a first uplink component carrier for the eNB 2 and at least a second uplink component carrier for at least another eNB.

The eNB 2 may also comprise a processor 22 configured to control the transceiver 21. The eNB 2 may also comprise a memory 23 in which programs for carrying out the functions according to the embodiment are stored. The transceiver 21, the processor 22 and the memory 23 may be inter-connected by a suitable connection 24, e.g., a bus or the like.

The eNB 2 can be implemented in the macro eNB and/or the pico eNB shown in FIG. 1, for example. For example, when the eNB 2 is the macro eNB shown in FIG. 1, the other eNB is the pico eNB shown in FIG. 1.

The two eNBs may be connected via an X2 interface, as shown in FIG. 1.

Figure 6:
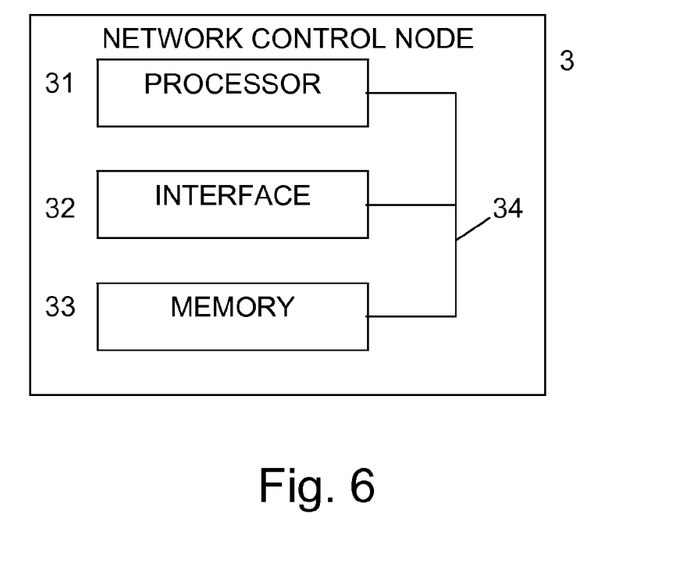
FIG. 6 shows an example for a network control node according to an embodiment of the invention.

FIG. 6 shows an example for a network control node 3 which coordinates the sharing of the single uplink connection between the two uplink carriers. The network control node 3 comprises a processor 31 which is configured to establish a sharing of a single uplink connection of a user entity, the user entity being connectable to a first network node by a first downlink component carrier and to at least a second network node by a at least second downlink component carrier, and by the single uplink connection, wherein the sharing is used to share the uplink connection among a first uplink component carrier for the first network node and at least a second uplink component carrier for the at least second network node.

The network control node 3 may also comprise an interface 32 which is configured to provide a connection to the network nodes involved. The network control node 3 may be one of the first network node and the second network node (e.g., the macro eNB shown in FIG. 1), so that in this case the interface 32 may be an X2 interface. Furthermore, the network control node 3 may also comprise a memory 33 in which programs for carrying out the functions according to the embodiment are stored. The processor 31, the interface 32 and the memory 33 may be inter-connected by a suitable connection 34, e.g., a bus or the like.

Figure 7:
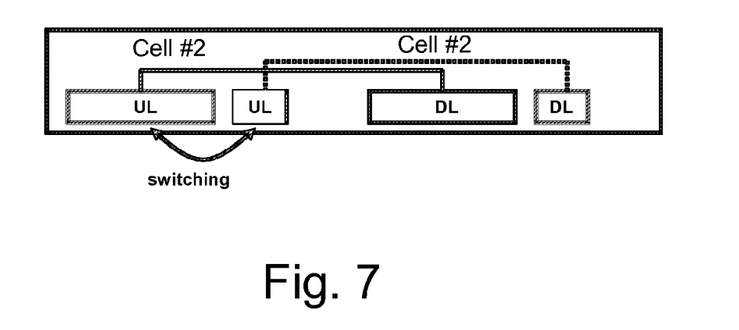
FIG. 7 illustrates a principle of embodiments of the invention.

Thus, according to certain embodiments of the present invention, a shared UL functionality for multiple DL carriers (or Cells) operating in FDD (Frequency Division Multiplexing) mode is provided. The operation principle is shown in FIG. 7.

In the proposed arrangement, the entire UL functionality including data channels (PUSCH) and control channels (PUCCH, UCI on PUSCH, PRACH) and reference signals (DM RS, SRS) are transmitted in time division multiplexed (TDM) manner among two UL carriers. That is, the UL is switched between the two carriers (cell #1 and cell #1).

In the considered solution, there is a pre-defined UL time division (e.g., sub-frame division) related to different DL component carriers. The time-division is applied only in up-link direction (DL is available for each sub-frame). The UL time division is configured by the network via higher layer signalling and in UE-specific manner.

Preferably, the following assumptions should be made in order to guarantee proper control signalling operation:
Frame synchronization between multiple UL carriers
The pre-defined time division may be coordinated by one of the eNBs (e.g., macro node) participating the inter-site carrier aggregation.
Predetermined switching time (e.g., sub-frame(s) or SC-FDMA symbols) may be used to provide the necessary UL CC switching time for the UE.

The remaining step is to provide the sufficient A/N signalling support to convey the necessary UL data-non-associated control signals via the available UL sub-frames.

Next, TDM aspects corresponding to shared UL carrier are considered in more detail.

Handling A/N:
A/N timing is changed according to a predetermined rule (see more details in FIG. 8 and FIG. 9)
A/N codebook size (i.e. number of A/N bits transmitted in a given UL subframe) is adjusted in a predetermined way taking into account the transmission mode of the DL CC and the number of A/N bits to be conveyed in different UL subframes.
Preferably, PUCCH Format 3 is used as A/N container for PUCCH. However, the invention is not limited to this, and also another suitable format may be used.

Handling periodic signals such as CQI/PMI/RI/SR:
Periodic signals are configured separately for each component carrier
Periodic signals which fall in the sub-frames allocated to another UL carrier are dropped
eNB can configure the CSI reporting in way which minimizes/avoids the CSI dropping.
Alternatively resources for periodic signals can be reserved on each UL carrier and the signals are transmitted on the available carrier/resource. In that case there is no need to drop signals.

Handling PUSCH:
eNB does not schedule PUSCH on the sub-frames allocated to another UL carrier (It is noted that those subframes are available for other UEs in the cell).
UL HARQ process arrangement can be adjusted in a way that it takes into account "missing UL frames".

Figure 8:
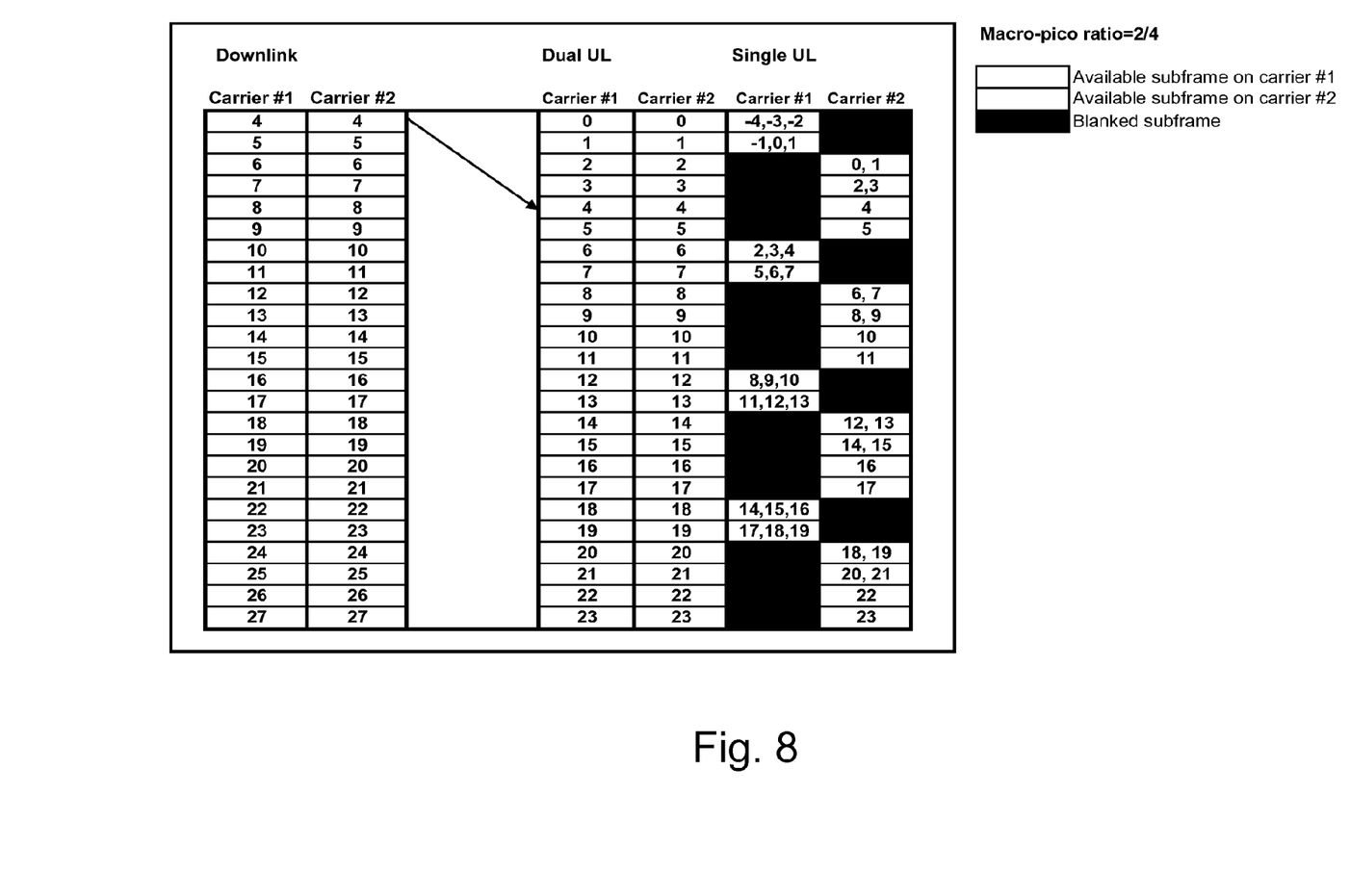
FIG. 8 shows an exemplary UL subframe division between two carriers according to embodiments of the present invention.
Figure 9:
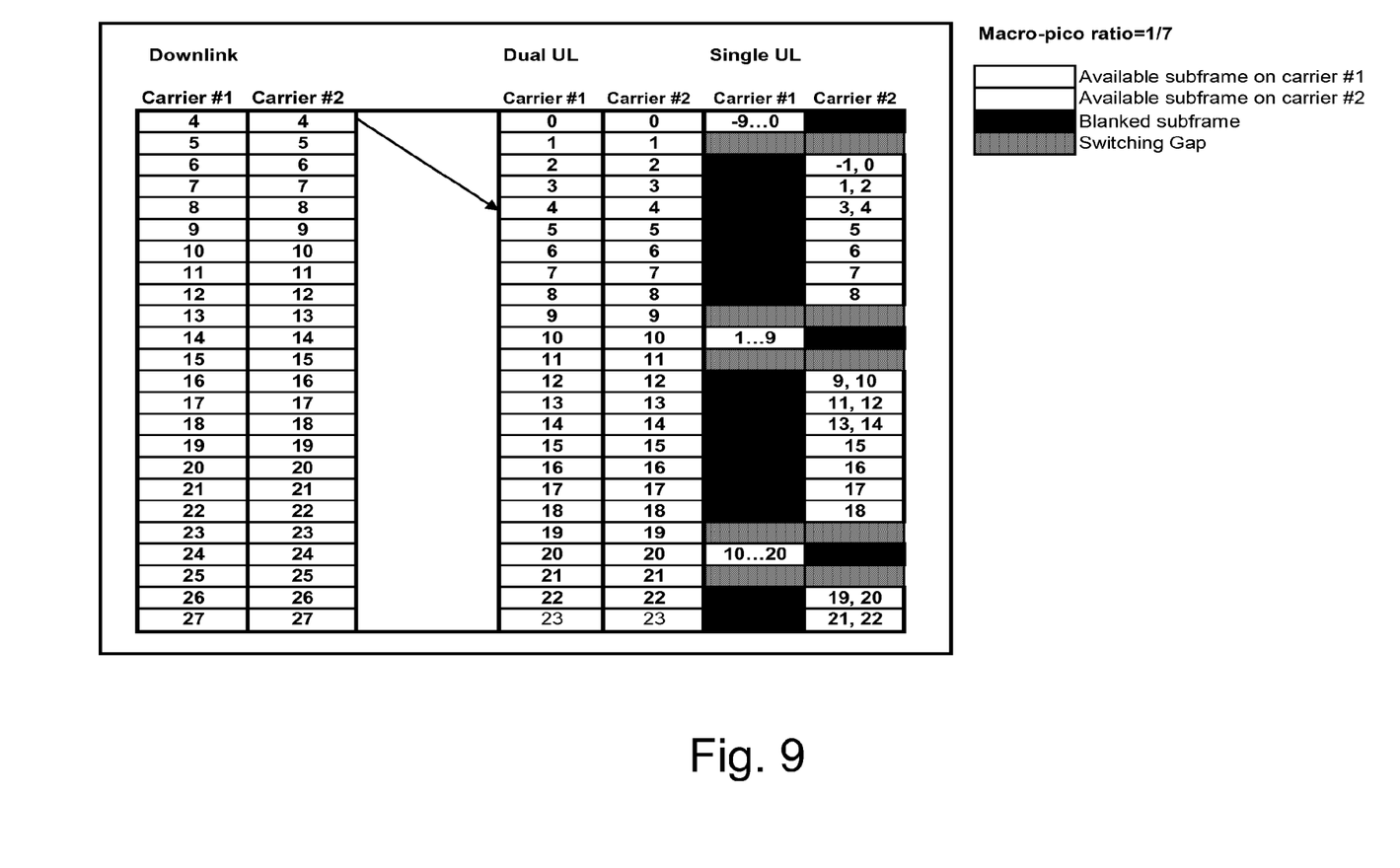
FIG. 9 shows an exemplary UL subframe division between two carriers according to embodiments of the present invention, wherein switching gaps are included.

FIG. 8 and FIG. 9 show exemplary timing diagram for DL HARQ A/N. The assumption is that there are two component carriers in the DL and UL side. Carrier #1 as been allocated to a macro cell and Carrier #2 to a pico cell, respectively. FIG. 9 assumes that pre-defined UL sub-frames have been allocated for the UE to perform the UL CC switching.

Arrows in FIG. 8 and FIG. 9 illustrate the timing relationship of LTE Rel-8/9/10 (FDD) in which A/N corresponding to DL subframe #n is transmitted on UL subframe #(n+4).

In both examples, a certain ratio between the two carriers (for the macro cell and the pico cell) is indicated. In FIG. 8, the macro-pico ratio is 2/4. That is, for 2 subframes provided for the macro cell (carrier #1), 4 subframes are provided for the pico cell (carrier #2). In FIG. 9 the macropico ratio is 1/7. That is, for 1 subframes provided for the macro cell (carrier #1), 7 subframes are provided for the pico cell (carrier #2). This ratio can be pre-configured according to the situation.

Summarizing, certain embodiments of the invention relate to the carrier aggregation in systems like LTE—targeting inter-eNB carrier aggregation with the limitation of the UE not being uplink carrier aggregation (UL CA) capable (can only transmit on one UL carrier) and having a "slow-X2" interface between the involved eNBs.

Certain embodiments of the invention introduce a time domain switching/sharing functionality that will allow a single-UL-carrier-UE to be connected to multiple eNBs (in a time multiplexed manner) i.e. this supports asymmetric (e.g. 2DL, 1UL) inter-site carrier aggregation by time domain multiplexing (TDM) the uplink control signalling to the two nodes so that only one UL CC is transmitted by the UE at a time.

In other words, in the context of inter-site LTE carrier aggregation (CA) with high delay and high jitter backhaul connection (X2) between sites, this invention introduces a method to provide carrier-related uplink control information to the geographically separated transmission points in case the UE does not support carrier aggregation in uplink (i.e. only able to transmit on one frequency at a time). The idea is basically to introduce a TDM mechanism where uplink control information (UCI) for carrier 1 and carrier 2 are transmitted different subframes. The idea also introduces the possibility to have "blank" subframes to allow the UE to retune its radio frequency (RF). It is noted that instead of "blank" subframes it is possible to perform retuning the RF during a fraction of UL subframe. One example is to make the retuning during the time reserved for transmitting the sounding reference signal (SRS), i.e. to have a blank SC-FDMA symbol for retuning.

In the following, some advantages are described which can be achieved by the proposed scheme according to the embodiments described above.

Inter-site CA can be supported with for single-CC capable UEs
It provides better UL link budget compared to dual carrier solution
It supports fully independent scheduling
Standardization effort on top of existing carrier aggregation solution is feasible.

The switching gaps (as shown in FIG. 9) may reduce the UL throughput compared to collocated CA. However, this is considered as minor issue due to the following aspects:
DL carrier aggregation is a capacity booster for DL direction
UL link budget is not a problem for UEs connected to the pico/femto cells. It is possible to make the proper actions also in macro site to make sure that UL throughput is not an issue
Switching gaps are not needed in all scenarios (e.g., in intra-band cases).
Other UEs can utilized PUSCH resources corresponding to switching gaps (in other words, there is no degradation in system level).
It may be enough to reserve only a fraction of the sub-frame for the switching time (e.g., SRS symbol).

According to the embodiments described above, two network nodes (eNBs, i.e., a macro eNB and a pico eNB) are applied. However, the number of network nodes is not limited. That is, depending on the situation, a carrier aggregation with respect to three or more eNBs may be applied.

Moreover, the scenario is not limited to different kinds of eNBs. That is, the UE may also be connected to two macro eNBs, for example.

Moreover, embodiments of the present invention were described by referring to LTE. However, the invention is not limited to this, and can be applied to any communication scheme in which a carrier aggregation or a similar measure can be applied and only a single uplink connection is available.

According to a first aspect of several embodiments of the invention, an apparatus is provided which comprises
- a transceiver configured to be connectable to a first network node by a first downlink component carrier and to at least a second network node by a at least second downlink component carrier, wherein the transceiver is configured to provide a single uplink connection, and
- a processor configured to control the transceiver such that the uplink connection is shared among a first uplink component carrier to the first network node and at least a second uplink component carrier to the at least second network node.

The first aspect may be modified as follows:

The processor may be configured to control the transceiver such that the sharing among the first and the second uplink carriers is performed in a time divisional multiplexed manner.

The processor may be configured to apply a pre-defined uplink time division on the uplink connection related to the first downlink component carrier and the at least second downlink component carrier.

The processor may be configured to receive the pre-defined uplink time division from a network control node.

The processor may be configured to perform a frame synchronization between the first uplink component carrier and the at least second uplink component carrier.

The time division may be performed by dividing sub-frames.

The processor may be configured to schedule predetermined sub-frames or single carrier frequency division multiple access symbols for providing uplink component carrier switching time.

The processor may be configured to schedule timing of control signals to be sent via the uplink component carriers according to a predetermined rule with respect to sharing of the uplink component carriers.

The apparatus may be a user entity or may be a part thereof.

According to a second aspect of several embodiments of the invention, an apparatus is provided which comprises
- a transceiver configured to be connectable to a user equipment by a first downlink component carrier and by a single uplink connection,
- wherein the uplink connection is shared among a first uplink component carrier for the apparatus and at least a second uplink component carrier for at least another network node.

The first aspect may be modified as follows:

The sharing among the first and the second uplink carriers may be performed in a time divisional multiplexed manner.

The apparatus may further comprise a processor,
wherein for the time divisional multiplexed manner, a pre-defined uplink time division on the uplink connection may be used, and the processor may be configured to establish the pre-defined uplink time division, wherein the transceiver may be configured to send the pre-defined uplink time division to the user equipment and to the at least other network node.

Predetermined sub-frames or single carrier frequency division multiple access symbols may be scheduled for providing uplink component carrier switching time.

The processor may be configured to schedule timing of control signals to be sent via the uplink component carriers according to a predetermined rule with respect to sharing of the uplink component carriers.

The apparatus may be an eNB or may be a part thereof.

According to a third aspect of several embodiments of the invention, an apparatus is provided which comprises
- a processor configured to establish a sharing of a single uplink connection of a user entity, the user entity being connectable to a first network node by a first downlink component carrier and to at least a second network node by a at least second downlink component carrier and by the uplink connection, wherein the sharing is used to share the uplink connection among a first uplink component carrier for the first network node and at least a second uplink component carrier for the at least second network node.

The third aspect may be modified as follows:

The sharing among the first and the second uplink carriers may be performed in a time divisional multiplexed manner, and the processor may be configured to establish a pre-defined time division.

The processor may be configured to schedule predetermined sub-frames or single carrier frequency division multiple access symbols for providing uplink component carrier switching time.

The processor may be configured to schedule timing of control signals to be sent via the uplink component carriers according to a predetermined rule with respect to the time division of the uplink component carriers.

According to a fourth aspect of several embodiments of the invention, a method is provided which comprises
- controlling a transceiver connectable to a first network node by a first downlink component carrier and to at least a second network node by a at least second downlink component carrier, wherein the transceiver is configured to provide a single uplink connection, and
- controlling the transceiver such that the uplink connection is shared among a first uplink component carrier to the first network node and at least a second uplink component carrier to the at least second network node.

The fourth aspect may be modified as follows:

The method may further comprise controlling the transceiver such that the sharing among the first and the second uplink carriers is performed in a time divisional multiplexed manner.

The method may further comprise applying a pre-defined uplink time division on the uplink connection related to the first downlink component carrier and the at least second downlink component carrier.

The method may further comprise receiving the pre-defined uplink time division from a network control node.

The method may further comprise performing a frame synchronization between the first uplink component carrier and the at least second uplink component carrier.

The time division may be performed by dividing sub-frames.

The method may further comprise scheduling predetermined sub-frames or single carrier frequency division multiple access symbols for providing uplink component carrier switching time.

The method may further comprise scheduling timing of control signals to be sent via the uplink component carriers according to a predetermined rule with respect to sharing of the uplink component carriers According to a fifth aspect of several embodiments of the invention, a method is provided which comprises
receiving uplink information from a user equipment by a single uplink connection, the user equipment being connected to a first network node and a second network node, and
wherein the uplink connection is shared among a first uplink component carrier for the first network node and at least a second uplink component carrier for the at least a second network node.

The fifth aspect may be modified as follows:
The sharing among the first and the second uplink carriers may be performed in a time divisional multiplexed manner.
The method may further comprise
using a pre-defined uplink time division on the uplink connection for the time divisional multiplexed manner,
establishing the pre-defined uplink time division, and
sending send the pre-defined uplink time division to the user equipment and to the at least second network node.
The method may further comprise scheduling predetermined sub-frames or single carrier frequency division multiple access symbols for providing uplink component carrier switching time.
The method may further comprise scheduling timing of control signals to be sent via the uplink component carriers according to a predetermined rule with respect to sharing of the uplink component carriers.

According to a sixth aspect of several embodiments of the invention, a method is provided which comprises
establishing a sharing of a single uplink connection of a user entity, the user entity being connectable to a first network node by a first downlink component carrier and to at least a second network node by a at least second downlink component carrier and by the uplink connection, wherein the sharing is used to share the uplink connection among a first uplink component carrier for the first network node and at least a second uplink component carrier for the at least second network node.

The second aspect may be modified as follows:
The sharing among the first and the second uplink carriers may be performed in a time divisional multiplexed manner, and the establishing may comprise establishing a pre-defined time division.
The method may further comprise scheduling predetermined sub-frames or single carrier frequency division multiple access symbols for providing uplink component carrier switching time.
The method may further comprise scheduling timing of control signals to be sent via the uplink component carriers according to a predetermined rule with respect to the time division of the uplink component carriers.

According to a seventh aspect of several embodiments of the invention, an apparatus is provided which comprises
transceiving means connectable to a first network node by a first downlink component carrier and to at least a second network node by a at least second downlink component carrier, and for providing a single uplink connection, and
control means for controlling the transceiving means such that the uplink connection is shared among a first up-link component carrier to the first network node and at least a second uplink component carrier to the at least second network node.

The seventh aspect may be modified as follows:
The apparatus may further comprise means for controlling transceiving means such that the sharing among the first and the second uplink carriers is performed in a time divisional multiplexed manner.
The apparatus may further comprise means for applying a predefined uplink time division on the uplink connection related to the first downlink component carrier and the at least second downlink component carrier.
The apparatus may further comprise means for receiving the pre-defined uplink time division from a network control node.
The apparatus may further comprise means for performing a frame synchronization between the first uplink component carrier and the at least second uplink component carrier.
The apparatus may further comprise means for scheduling predetermined sub-frames or single carrier frequency division multiple access symbols for providing uplink component carrier switching time.
The apparatus may further comprise means for scheduling timing of control signals to be sent via the uplink component carriers according to a predetermined rule with respect to sharing of the uplink component carriers.
Further modifications may be similar as modifications of the first aspect.

According to an eighth aspect of several embodiments of the invention, an apparatus is provided which comprises
a transceiving means connectable to a user equipment by a first downlink component carrier and by a single uplink connection, and
means for sharing the uplink connection among a first uplink component carrier for the apparatus and at least a second uplink component carrier for at least another network node.

The eighth aspect may be modified as follows:
For the time divisional multiplexed manner, a pre-defined up-link time division on the uplink connection may be used, and the apparatus may comprise means for establishing the predefined uplink time division and for sending the pre-defined uplink time division to the user equipment and to the at least other network node.
The apparatus may further comprise means for scheduling timing of control signals to be sent via the uplink component carriers according to a predetermined rule with respect to sharing of the uplink component carriers.
Further modifications may be similar as modifications of the second aspect.

According to a ninth aspect of several embodiments of the invention, an apparatus is provided which comprises
means for establishing a sharing of a single uplink connection of a user entity, the user entity being connectable to a first network node by a first downlink component carrier and to at least a second network node by a at least second downlink component carrier and by the uplink connection, wherein the sharing is used to share the uplink connection among a first uplink component carrier for the first network node and at least a second uplink component carrier for the at least second network node.

The third aspect may be modified as follows:

The sharing among the first and the second uplink carriers may be performed in a time divisional multiplexed manner, and the apparatus may comprise means for establishing a predefined time division.

The apparatus may further comprise means for scheduling predetermined sub-frames or single carrier frequency division multiple access symbols for providing uplink component carrier switching time.

The apparatus may further comprise means for scheduling timing of control signals to be sent via the uplink component carriers according to a predetermined rule with respect to the time division of the uplink component carriers.

Further modifications may be similar as modifications of the third aspect.

According to a tenth aspect of several embodiments of the present invention, a computer program product is provided which comprises code means for performing a method according to any one of the fourth to sixths aspects and their modifications when run on a processing means or module.

The computer program product may be embodied on a computer-readable medium, on which the software code portions are stored, and/or the program may be directly loadable into a memory of the processor.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
a transceiver, said transceiver being configured to be connectable to a first network node by a first downlink component carrier and to at least one second network node by at least one second downlink component carrier, wherein said transceiver is configured for simultaneous downlink data reception on the first downlink component carrier from the first network node and on the at least one second downlink component carrier from the at least one second network node, and wherein the transceiver is further configured to provide only a single component carrier for an uplink connection;
at least one processor; and
at least one memory including computer program code, wherein the at least one memory and the computer program code are configured, with the at least one processor, to cause the apparatus at least to:
control the transceiver to share the single component carrier for the uplink connection among a first uplink signaling to the first network node and at least one second uplink signaling to the at least one second network node, wherein sharing among the first uplink signaling and the at least one second uplink signaling is performed in a time-divisional multiplexed manner.

2. The apparatus according to claim 1, wherein the at least one memory and the computer program code, with the at least one processor, are further configured to apply a predefined uplink time division on the uplink connection related to the first downlink component carrier and the at least one second downlink component carrier.

3. The apparatus according to claim 1, wherein the at least one memory and the computer program code, with the at least one processor are further configured to perform a frame synchronization among the first uplink signaling and the at least one second uplink signaling.

4. The apparatus according to claim 1, wherein the at least one memory and the computer program code, with the at least one processor, are further configured to schedule timing of control signals to be sent via the first uplink signaling and the at least one second uplink signaling according to a predetermined rule with respect to the sharing among the first uplink signaling and the at least one second uplink signaling.

5. An apparatus comprising:
at least one processor; and
at least one memory including computer program code, wherein the at least one memory and the computer code are configured, with the at least one processor, to cause the apparatus at least to perform the following:
configuring a transceiver to be connectable to a user equipment by a first downlink component carrier and by only a single component carrier for an uplink connection, and
sharing the single component carrier for the uplink connection among a first uplink signaling for the apparatus and at least one second uplink signaling for at least one additional apparatus, wherein sharing among the first uplink signaling and the at least one second uplink signaling is performed in a time: divisional multiplexed manner.

6. The apparatus according to claim 5, wherein, for the time-divisional multiplexed manner, a pre-defined uplink time division on the uplink connection is used, and wherein the at least one memory and the computer program code, with the at least one processor, are further configured to establish the pre-defined uplink time division, wherein the transceiver is further configured to send the pre-defined uplink time division to the user equipment and to the at least one additional apparatus.

7. The apparatus according to claim 5, wherein predetermined sub-frames or single carrier frequency division multiple access symbols are scheduled for providing uplink signaling switching time.

8. The apparatus according to claim 5, wherein the at least one memory and the computer program code, with the at least one processor, are further configured to schedule timing of control signals to be sent via the first uplink signaling and the at least one second uplink signaling according to a predetermined rule with respect to the sharing of among the first uplink signaling and the at least one second uplink signaling.

9. An apparatus comprising:
at least one processor; and
at least one memory including computer program code, wherein the at least one memory and the computer program code are configured, with the at least one processor, to cause the apparatus at least to:
establish a sharing of only a single component carrier for an uplink connection of a user entity equipment, wherein the user equipment is connectable to a first network node by a first downlink component carrier and to at least one second network node by at least one second downlink component carrier and by the uplink connection, wherein the sharing is used to share the single component carrier for the uplink connection among a first uplink signaling to the first network node and at least one second uplink signaling to the at least one second network node, and wherein the sharing among the first uplink signaling and the at least one second uplink signaling is performed in a time-divisional multiplexed manner, and the at least one processor is configured to establish a pre-defined time division.

10. The apparatus according to claim 9, wherein the at least one memory and the computer program code, with the at least one processor are further configured to schedule predetermined sub-frames or single carrier frequency division multiple access symbols for providing uplink signaling switching time.

11. The apparatus according to claim 9 wherein the at least one memory and the computer program code, with the at least one processor, are further configured to schedule timing of control signals to be sent via the first uplink signaling and the at least one second uplink signaling according to a predetermined rule with respect to the time division of the first uplink signaling and the at least one second uplink signaling.

12. A method comprising:
controlling a transceiver, said transceiver being configured to be connectable to a first network node by a first downlink component carrier and to at least one second network node by at least one second downlink component carrier, wherein said transceiver is configured for simultaneous downlink data reception on the first downlink component carrier from the first network node and on the at least one second downlink component carrier from the at least one second network node, and wherein the transceiver is further configured to provide only a single component carrier for an uplink connection; and
controlling the transceiver to share the single component carrier for the uplink connection among a first uplink signaling to the first network node and at least one second uplink signaling to the at least one second network node, wherein the sharing among the first uplink signaling and the at least one second uplink signaling is performed in a time-divisional multiplexed manner.

13. The method according to claim 12, further comprising:
applying a pre-defined uplink time division on the uplink connection related to the first downlink component carrier and the at least one second downlink component carrier.

14. The method according to claim 12, further comprising:
performing a frame synchronization among the first uplink signaling and the at least one second uplink signaling.

15. The method according to claim 12, further comprising:
scheduling timing of control signals to be sent via the first uplink signaling and the at least one second uplink signaling according to a predetermined rule with respect to the sharing of among the first uplink signaling and the at least one second uplink signaling.

16. A computer program product comprising non-transitory computer-readable medium comprising code for performing a method according to claim 12 when run on at least one processor.

* * * * *

UNITED STATES PATENT AND TRADEMARK OFFICE
CERTIFICATE OF CORRECTION

PATENT NO. : 10,455,554 B2
APPLICATION NO. : 14/122296
DATED : October 22, 2019
INVENTOR(S) : Tiirola et al.

Page 1 of 1

It is certified that error appears in the above-identified patent and that said Letters Patent is hereby corrected as shown below:

In the Claims

Claim 8, Column 13, Line 37 "of" should be deleted in front of --among--.

Claim 9, Column 13, Line 46 "entity" should be deleted in between --user-- and --equipment--.

Claim 12, Column 14, Line 32 "the" should be deleted in between --wherein-- and --sharing--.

Signed and Sealed this
Third Day of December, 2019

Andrei Iancu
*Director of the United States Patent and Trademark Office*